(12) United States Patent
Fach

(10) Patent No.: US 9,801,498 B2
(45) Date of Patent: Oct. 31, 2017

(54) BLENDING CONTAINER TO FILL FOOD POUCHES AND THE LIKE

(71) Applicant: Bradley C. Fach, Charlotte, NC (US)

(72) Inventor: Bradley C. Fach, Charlotte, NC (US)

( * ) Notice: Subject to any disclaimer, the term of this patent is extended or adjusted under 35 U.S.C. 154(b) by 482 days.

(21) Appl. No.: 14/137,029

(22) Filed: Dec. 20, 2013

(65) Prior Publication Data

US 2014/0178545 A1    Jun. 26, 2014

Related U.S. Application Data

(60) Provisional application No. 61/740,027, filed on Dec. 20, 2012.

(51) Int. Cl.
*A47J 43/00* (2006.01)
*A47J 43/046* (2006.01)
*A47J 43/07* (2006.01)

(52) U.S. Cl.
CPC ......... *A47J 43/046* (2013.01); *A47J 43/0716* (2013.01); *A47J 43/0727* (2013.01)

(58) Field of Classification Search
CPC ... A47J 43/046; A47J 43/0716; A47J 43/0727
USPC ....................................................... 366/205
See application file for complete search history.

(56) References Cited

U.S. PATENT DOCUMENTS

| | | | | |
|---|---|---|---|---|
| 5,526,949 A * | 6/1996 | Carey | ................. | A47J 43/0727 366/205 |
| 5,671,664 A * | 9/1997 | Jacobson | ................. | A47J 43/24 366/314 |
| 6,817,750 B1 | 11/2004 | Sands | | |
| 7,066,640 B2 | 6/2006 | Sands | | |
| 2011/0024537 A1 * | 2/2011 | Gonzalez | .............. | A47J 43/046 241/101.2 |
| 2011/0121028 A1 | 5/2011 | Rusch | | |
| 2011/0149677 A1 * | 6/2011 | Davis | .................... | A47J 43/042 366/205 |
| 2012/0230613 A1 | 9/2012 | Galland et al. | | |

FOREIGN PATENT DOCUMENTS

GB          2498422 A        7/2013

* cited by examiner

*Primary Examiner* — Tony G Soohoo
*Assistant Examiner* — Anshu Bhatia
(74) *Attorney, Agent, or Firm* — Bradley C. Fach

(57) ABSTRACT

The present invention comprises novel methods, devices, and systems, such as blending containers configured to be used with a blender or food processor. The system comprises a blending container configured to attach to a blender or blender base unit with at least one aperture which may be positioned anywhere on the blending container. In preferred embodiments, the system comprises one or more nozzles, which may be temporarily attached to an opening or sprout on a food and beverage pouch, are configured to attach to or be positioned over one or more apertures. In some embodiments, the containers are generally cylindrical in shape and comprise two ends. A first end is open and comprises male or female threading configured to be removable mounted to a blender base unit configured with blender blades. In some embodiments, a second end is substantially closed with a smaller aperture. In other embodiments, the second end comprises a larger aperture and may be removably connected to a filling cap or plunger cap.

3 Claims, 6 Drawing Sheets

BLENDING CONTAINER TO FILL FOOD POUCHES AND THE LIKE

CROSS-REFERENCE TO RELATED APPLICATIONS

The present application claims priority to U.S. Provisional Patent Application No. 61/740,027 filed Dec. 20, 2012, and entitled "NOVEL BLENDER CONTAINER CONFIGURED TO FILL FOOD AND BEVERAGE POUCHES," the contents of which are incorporated by reference herein.

FIELD OF THE INVENTION

The present invention relates to blenders, blender containers, and flexible food and beverage containers known as pouches. More specifically, the invention relates to novel devices and methods for blending food and liquids and filling food and beverage pouches including baby food pouches using blender containers.

BACKGROUND

Flexible food and beverage containers such as pouches are well known in the art. Traditional food and beverage pouches are manufactured with thermoplastic sheet material which may be foil-lined in order to create an impervious barrier to seal liquid and other material within the pouch. Food and beverage pouches are frequently used to store foods such as baby food or drinks such as juices, sodas, and even alcoholic beverages. Users often prefer these flexible pouches to store and transport food and beverages because they are lightweight, easy to use, and do not shatter or break like traditional glass or plastic containers.

There is a growing movement in the United States and around the world to consume more natural, homemade foods and beverages. In particular, parents of young children are especially concerned about what types of food their children are eating. As a result, there are millions of individuals around the world who frequently make their own foods and beverages. Unfortunately, storage and transportation of these homemade foods and beverages is limited to traditional glass and plastic containers which are bulky and may break or shatter.

The use of small portion blenders and food processors to make baby food is well known. U.S. Pat. No. 6,817,750 describes an individualized blender which is configured with a blender body, a bullet shaped container, and a selectively removable container base. While this blender system provides a convenient way to process food and beverages, it does not provide a means to fill food pouches. Users who want to fill their own pouches must transfer food and beverages from the blender container to a separate filling station. This process is time consuming and requires more components that have to be washed after each use making them not ideal for parents with young children and not a lot of expendable time.

There is therefore a great need in the field for new blender devices and systems to blend or otherwise process food and beverages to fill flexible food and beverage containers such as pouches.

BRIEF SUMMARY OF THE INVENTION

The present invention comprises novel devices and systems, such as containers configured to be used with a blender or food processor. These containers are further configured to fill food and beverage pouches and the like thereby reducing the need to transfer the blended food from a separate blending container to a separate pouch filling unit. In some embodiments, the containers are generally cylindrical in shape and comprise two ends. A first end is open and comprises male or female threading configured to be removable mounted to a blender unit base station configured with blender blades. A second end may comprise one large aperture which is similar in diameter to the diameter of the second end, or it may comprise at least one small aperture which is substantially smaller in diameter than the diameter of the second end. In preferred embodiments, the system comprises one or more nozzles, which may be temporarily attached to an opening on the second end and to sprouts on a food and beverage pouch.

In some embodiments, a second end is substantially closed with a small opening or aperture configured to allow blended food or beverage to pass through the opening and eventually into a pouch spout. In other embodiments, the second end comprises male or female threading allowing it to be removably connected to a pouch filling cap or plunger cap. The pouch filling cap generally comprises a nozzle which is configured with threading allowing it to be temporarily connected to the sprout of a food and beverage pouch. In these embodiments, a user may blend food in the novel blending container, attach a pouch to the nozzle of the filling cap, remove the container from the blender base unit, turn the container upside down, and force the contents from the container into the pouch (i.e. through gravity or with a plunger).

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New blending container systems, devices, and methods of dispensing food and beverages within collapsible pouches are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
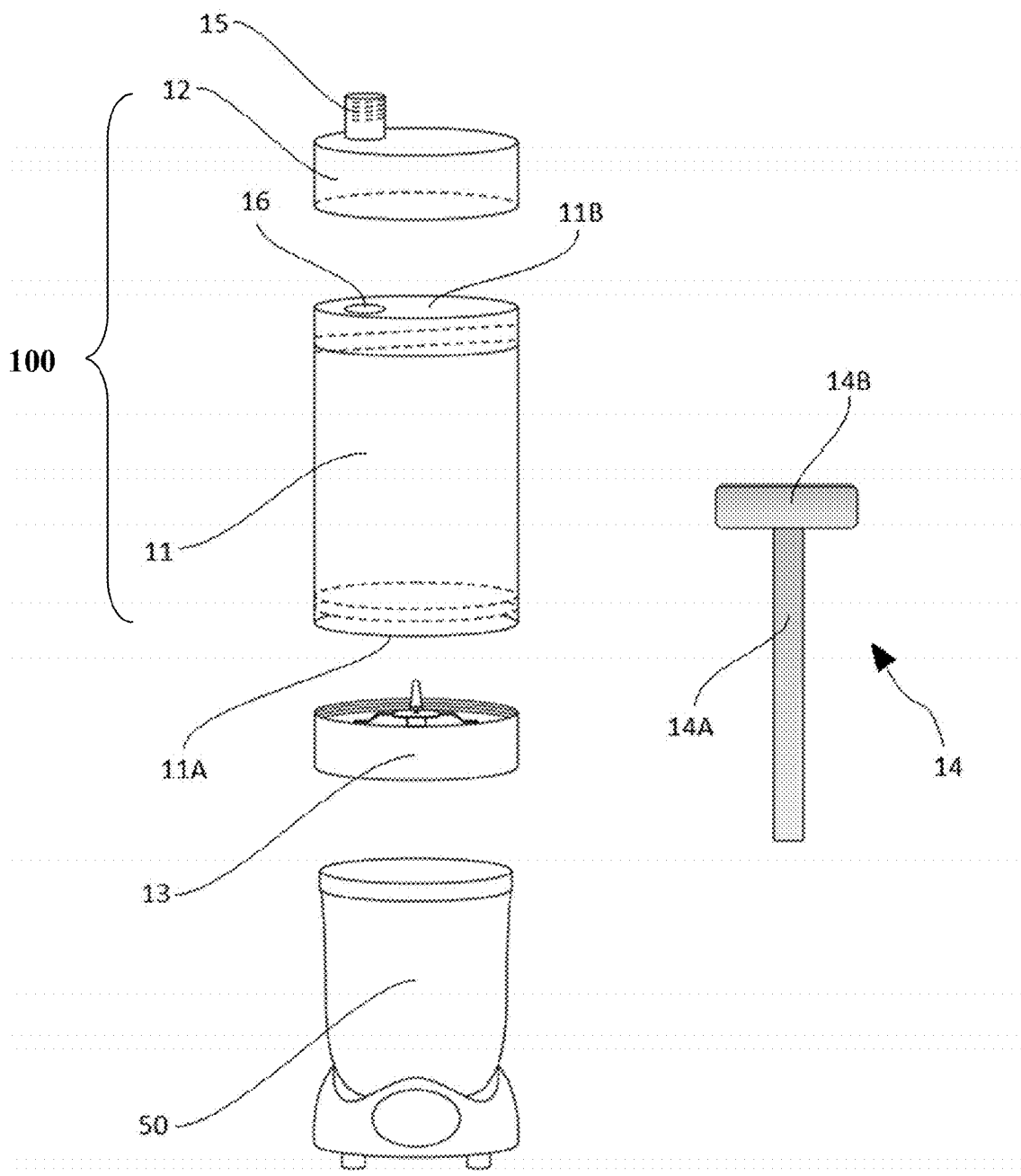
FIG. 1 shows a front exploded view of a system comprising an example of a blender container device according to some embodiments described herein.

The present invention will now be described by referencing the appended figures representing preferred embodiments. FIG. 1 depicts an exploded perspective view of an example of a blending container system 100 ("the system") according to various embodiments of the present invention configured for blending food and beverages. The system 100 generally comprises a blending container 11, a substantially open first end 11A, an aperture 16, and a nozzle 15. In some embodiments the system 100 may comprise a blender base unit 13 which is configured to attach to the first end 11A of the blending container 11 and various types of electric or manually powered blenders 50. In other embodiments, the system 100 may comprise a filling cap 12, to which a nozzle 15 may be attached, which is configured to position a nozzle 15 over an aperture 16 in a second end 11B of said blending container 11. In further embodiments, the system 100 may comprise a plunger 14 which may be used to assist with removing food and beverage from the blending container 11.

The blending container 11 may temporarily attach to a blender base unit 13 which is also configured to temporarily attach to an electric blender 50. In preferred embodiments, the blender base unit 13 may be threadedly attached to the blending container 11 through male and female threading. In other embodiments, the blender base unit 13 or the blending container 11 may be temporarily attached to the electric blender 50 with one or more cam like protrusions which may be engaged and disengaged from each other upon rotating the blender base unit 13 or blending container 11 in an opposite direction relative to the electric blender 50.

The blending container 11 serves as a chamber for containing food and beverage prior to, during, and after blending. In this view, the first end 11A of the blending container 11 is pointing down or closest to the blender base unit 13 and is configured to temporarily attach to the blender base unit 13. In preferred embodiments, the blender base unit 13 may be threadedly attached to the first end 11A. In other embodiments, the blender base unit 13 may be attached to the first end 11A with one or more cam like protrusions which may be engaged and disengaged from each other upon rotating the blender base unit 13 in an opposite direction relative to the first end 11A.

Blended food and beverage may be removed from the blending container 11 with the plunger 14. The plunger may comprise a handle 14A which is attached to a stopgap 14B. Food is removed from the blending container 11 by first inserting the stopgap 14B into either the substantially open first end 11A or into an aperture 16 located on the second end 11B of the blending container 11. In preferred embodiments, the second end 11B of the blending container 11 is substantially closed with one aperture 16 configured to align with a nozzle 15. The stopgap 14B may comprise a circular edge which is configured to contact the interior surface of the blending container 11 in a substantially perpendicular orientation. The handle 14A is used to press the stopgap 14B into the interior of the blending container 11 resulting in food and beverage being pressed out of the blending container 11 by way of an aperture 16. The handle 14A and stopgap 14B may be made from hard plastics, metal alloys, wood, or other suitable materials. In preferred embodiments, the circular edge of the stopgap 14B may comprise rubber, silicone, soft plastics, or other suitable flexible materials.

The blending container 11 may comprise one or more apertures 16 which are configured to allow food and beverages to pass out of the blending container 11 and through one or more nozzles 15. The apertures 16 may be of a plurality of sizes and shapes and located anywhere on the blending container 11 or blender base unit 13. In preferred embodiments, an aperture 16 of a circular shape with a diameter smaller than the diameter of the second end 11B of the blending container 11 and substantially similar in diameter to the diameter of the nozzle 15 is positioned off of the center of the second end 11B. In other embodiments, the aperture 16 may be substantially similar in size to the diameter the second end 11B of the blending container 11 and positioned centrally on the second end 11B. Communication between an aperture 16 and a nozzle 15 occurs when they are substantially aligned allowing food and beverage to pass from one through the other.

In preferred embodiments, the system 100 comprises one or more nozzles 15 that are configured to allow blended food and beverages to be dispensed from the blending container 11 into desired food containers such as pouches. The nozzles 15 may be permanently attached to the apertures 16 on the blending container 11, they may be temporarily attached to the apertures 16 by a temporary attachment means, or they may be positioned over the apertures 16 by way of a filling cap 12. Temporary attachment may comprise male and female threading, a cam engagement, or other types of twist on and off attachment mechanism located on the nozzles 15 and the area surrounding the apertures 16. In preferred embodiments, a nozzle 15 is configured to threadedly attach to the sprout of a food pouch. In other embodiments, a nozzle 15 is configured to threadedly attach to a plurality food containers in a manner that allows food to be transferred from the blending container 11 to a food container. In further embodiments, a nozzle 15 may be attached a food container with one or more cam like protrusions which may be engaged and disengaged from each other upon rotating the food container in an opposite direction relative to the nozzle 15. The blending container 11, filling cap 12, and nozzles 15 may be made from hard plastics, metal alloys, or other suitable materials that are preferably BPA free and dishwasher safe.

In this exemplary embodiment shown by FIG. 1, a filling cap 12 which comprises a nozzle 15 may be configured to temporarily attach to the second end 11B of the blending container 11 through male and female threading or by other means thereby allowing the nozzle 15 to be temporarily attached to the blending container 11 and positioned over an aperture 16. Once the nozzle 15 of a filling cap 12 is aligned over, or is otherwise in communication with, an aperture 16, food may pass from the blending container 11 through the aperture 16, filling cap 12, and nozzle 15 and into a food container such as a pouch. Temporary attachment may comprise male and female threading, a cam engagement, or other types of twist on and off attachment mechanisms located on the filling cap 12 and the second end 11B of the blending container 11. In some alternative embodiments, the nozzles 15 may be positioned over and attached to the apertures 16 without the use of a filling cap 12. In other embodiments, the nozzles 15 may be temporarily or permanently attached to the filling cap 12. Temporary attachment may comprise male and female threading, a cam engagement, or some other type of twist on and off attachment mechanism located on the nozzles 15 and the area surrounding the apertures 16.

Figure 2A:
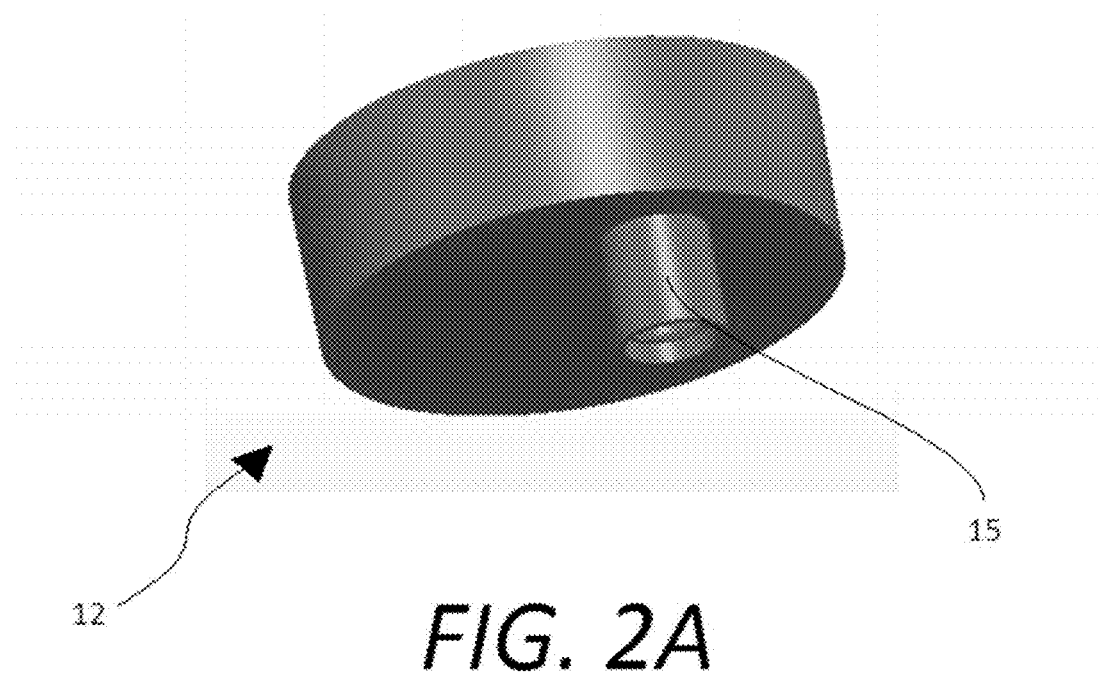
FIG. 2A shows a perspective view of one example of the exterior surface a filling cap with a nozzle configured to removably attach to food and beverage pouches as described in some embodiments herein.

FIG. 2 provides an example of a filling cap 12 which may be used with the system 100 (FIG. 1). FIG. 2A shows a perspective view of the exterior surface an exemplary filling cap 12 with a nozzle 15 configured to temporarily attach to food and beverage pouches as described in some embodiments herein. In other embodiments, the filling cap 12 may comprise between two and ten nozzles 15 which are configured to align with or communicate with one or more apertures 16 located on a blending container 11 to allow food and beverage to pass through them and into optionally attached food and beverage pouches.

Figure 2B:
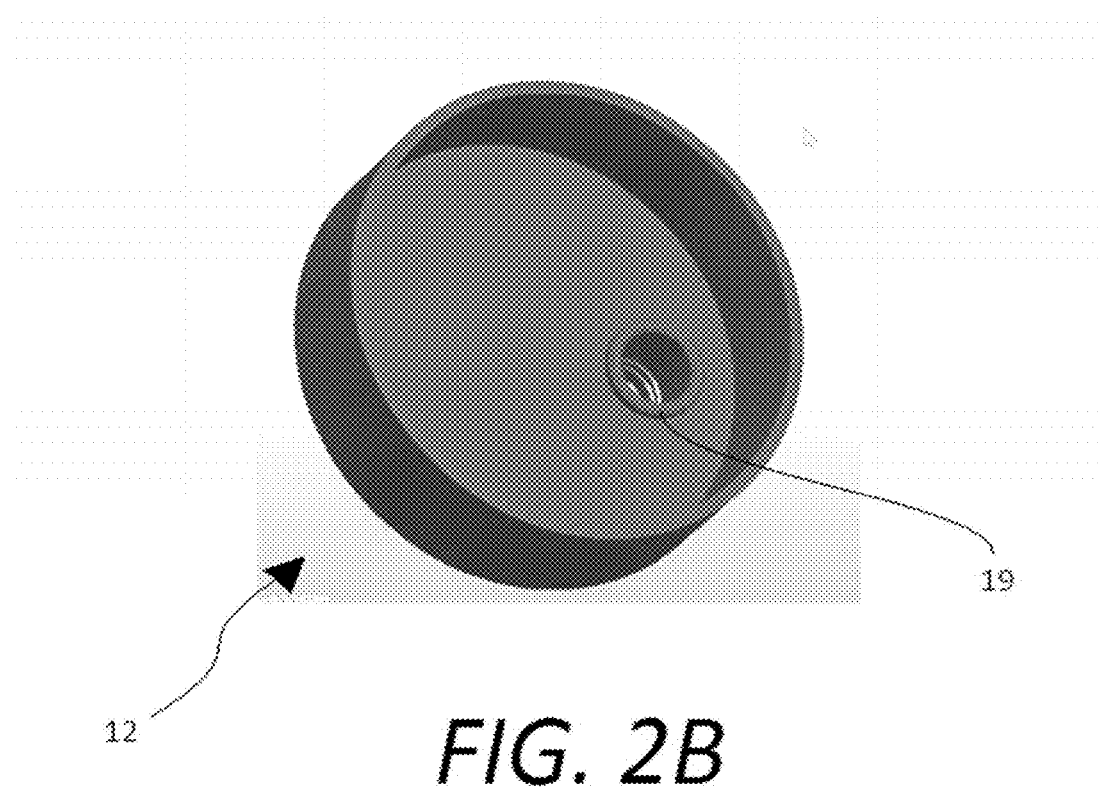
FIG. 2B illustrates a perspective view of one example of the interior surface a filling cap configured to removably attach the second end of a blending container as described in some embodiments herein.

FIG. 2B illustrates a perspective view of the interior surface of an exemplary filling cap 12 configured to removably attach the second end 11B (FIG. 1) of a blending container 11 (FIG. 1) according to some embodiments of the present invention. In some embodiments, a guide lip 19 may be positioned over the interior perimeter of the aperture for nozzle 15 (FIG. 2A) and be configured to contact the second end 11B (FIGS. 1 and 2) and in particular to fit within recessed guide track 17 of second end 11B exterior surface.

Figure 3A:
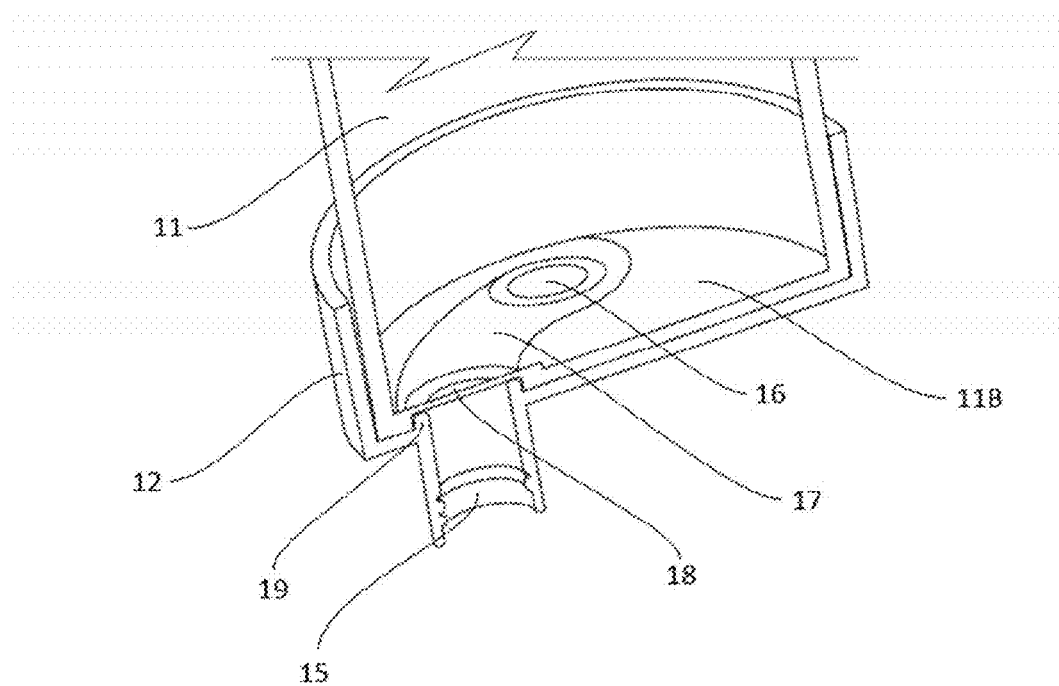
FIG. 3A illustrates a perspective cut away view of an example of the second end of a transparent blending container with an attached filling cap in the closed position which prevents the contents of the blender container from exiting through the nozzle of the filing cap according to some embodiments described herein.

In the embodiment depicted in FIG. 3A, an example of the second end 11B of a transparent blending container 11 with an attached filling cap 12 in the open position is shown which prevents the contents of the blender container 11 from exiting through the nozzle 15 of the filling cap 12. In this embodiment, the second end 11B of the blender container 11 comprises a recessed guide track 17 which further comprises a recessed stop 18 and an aperture 16. The filling cap 12 may be rotatably attached to the second end 11B and may comprise a nozzle 15 and a guide lip 19 which is positioned over the nozzle 15. The guide lip 19 may be configured to engage with the recessed guide track 17 by slightly protruding into the recessed guide track 17. Rotation of the filling cap 12 relative to the blending container 11, allows the guide lip 19 to travel within the confines of the guide track 17 which guides the nozzle 15 between recessed stop 18 (closed position) and the aperture 16 (open position) of the second end 11B. Food and beverage is prevented from exiting the aperture 16 by the recessed stop 18 or filling cap 12 surface which may substantially engage with the guide lip 19 of an associated nozzle 15 to prevent casual or accidental rotation of the filling cap 12 relative to the blending container 11.

Figure 3B:
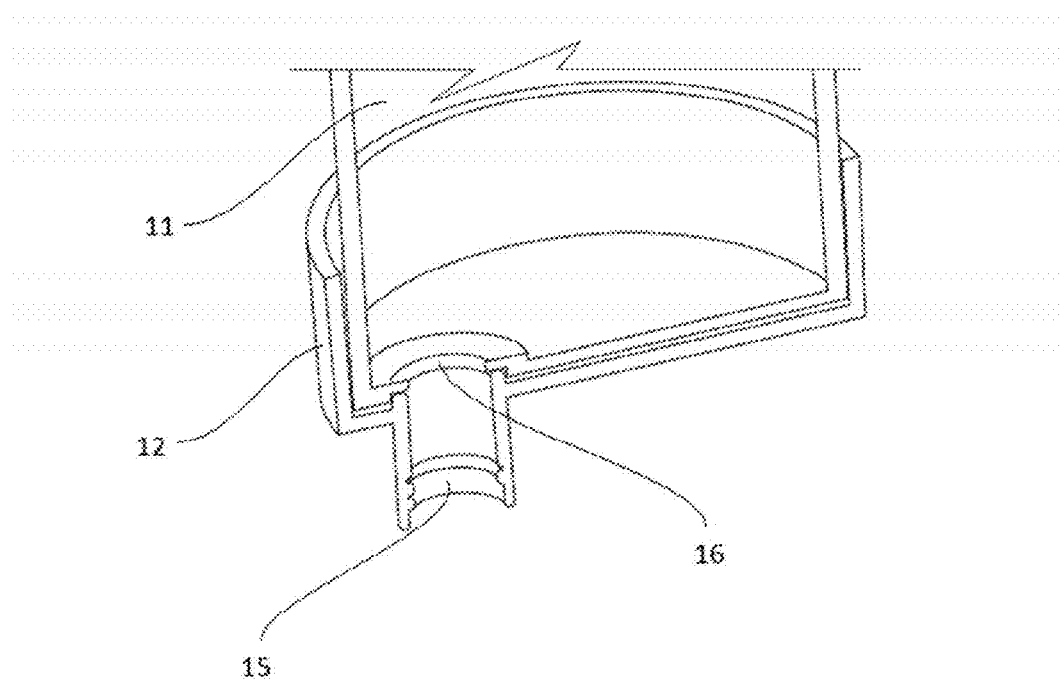
FIG. 3B depicts a perspective cut away view of an example of the second end of a transparent blending container with an attached filling cap in the open position which allows the contents of the blender container to exit through the nozzle of the filing cap according to some embodiments described herein.

Upon rotation (e.g. clockwise rotation) in a first direction of the filling cap 12 relative to the blending container 11 the aperture 16 may be aligned with the nozzle 15, as shown in FIG. 3B, allowing the food and beverage contents to exit the blending container 11 either through gravity or by applied pressure through a plunger 14 (FIG. 1). Once the aperture 16 and nozzle 15 are aligned or are in communication, the filling cap 12 is in the open position allowing food and beverage to pass from the aperture 16 and through the nozzle 15. In other embodiments, the filling cap 12 may be rotated in a second direction (e.g. counter clockwise rotation) relative to the blending container 11 to disalign the aperture 16 with the nozzle 15 to form a closed position.

Figure 4:
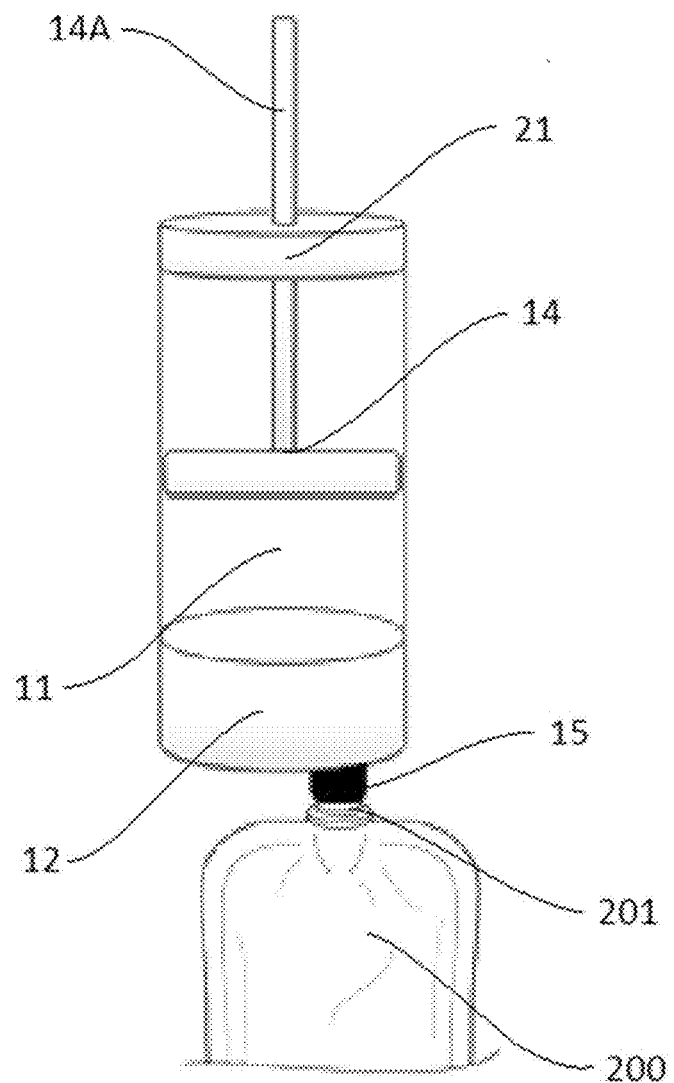
FIG. 4 depicts a perspective view of an example of a blending container with a plunger inserted into a first end and a filing cap attached to a second end with a food and beverage pouch attached to the nozzle of the filing cap according to various embodiment described herein.

FIG. 4 depicts a front view of an example of a system 100 comprising blending container 11 with a plunger 14 inserted into a first end 11A and a filling cap 12 attached to a second end 11B (FIGS. 1, 3A, and 3B) with a food and beverage pouch 200 attached to a nozzle 15 of the filling cap 12 according to various embodiment described herein. Food and beverage may be pressed out of the aperture 16 (FIGS. 1, 3A, and 3B) of the blending container 11 through the filling cap 12 and nozzle 15 and through the sprout 201 of the food and beverage pouch 200 by pressing the plunger 14 towards the second end 11B. In some embodiments, an optional plunger cap 21 may be temporarily attached, in a manner similar to the temporary attachment of the blender base unit 13 (FIG. 1), to the first end 11A (FIG. 1) which is configured to accept and guide the handle 14A of the plunger 14.

Figure 5:
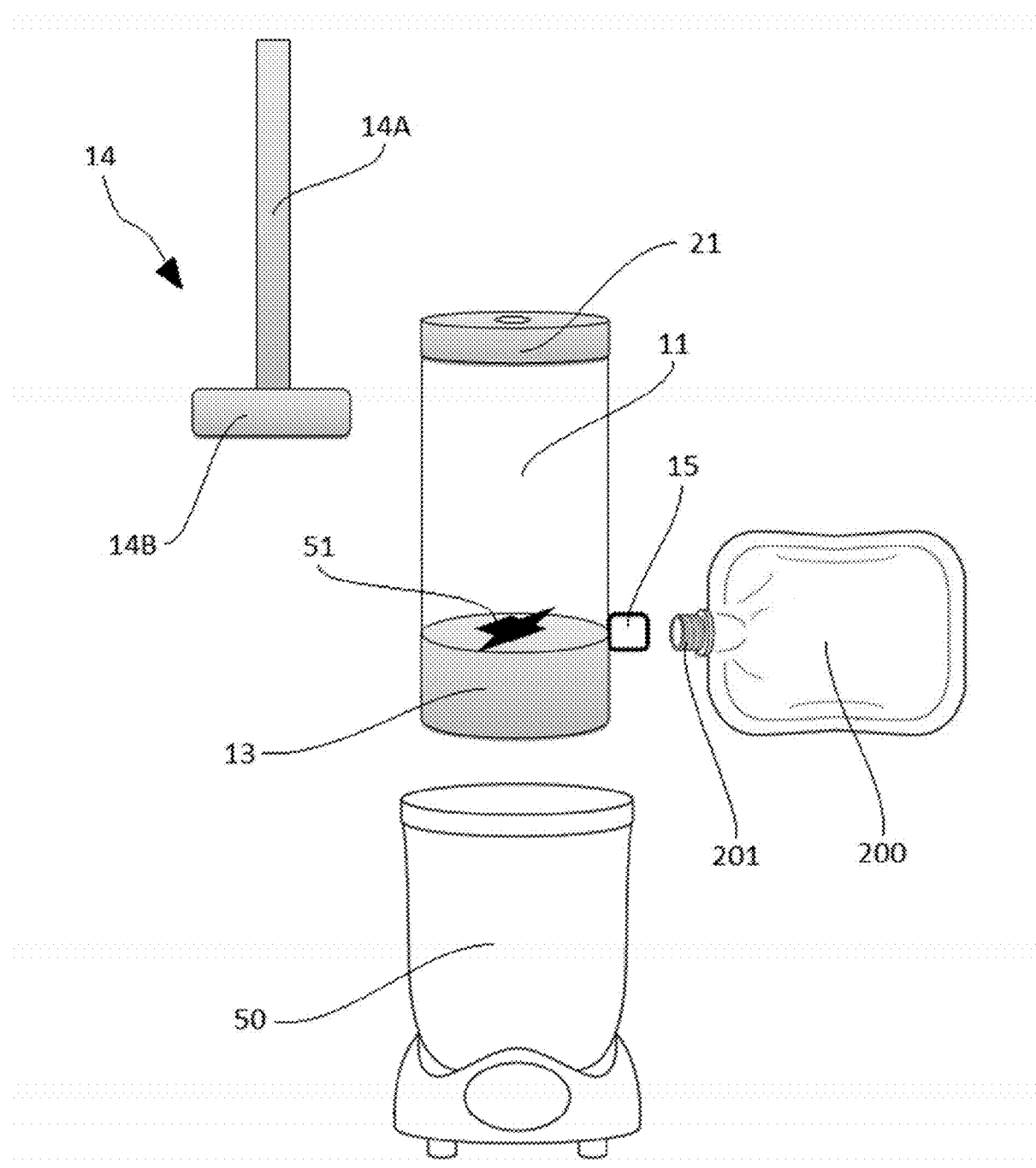
FIG. 5 illustrates a front view of a system according to some alternative embodiments as discussed herein. In this example, a blending container is configured with a side nozzle configured to attach the sprout of a pouch. In this example, the blending container may be removably connected to a blender base unit to blend or otherwise process food wherein the blender base unit is removably connected to an electric blender. The blender container is configured to be attached to the sprout of a pouch while still sitting on top of the blender base unit and electric blender. In this embodiment, a user may remove a removable cap from the top of the blender container, and force food out of the container and into the pouch using a plunger.

FIG. 5 illustrates some alternative embodiments as discussed herein. In this example, the system 100 is configured with a nozzle 15 located on the blending container 11 and substantially close to the first end 11A (FIG. 1) with an attached blender base unit 13. In other embodiments, the blender base unit 13 may be configured with one or more nozzles 15 configured to attach to one or more sprouts 201. In this embodiment, the second end 11B may not comprise a filling cap 12 (FIGS. 1, 2, and 3). The second end 11B (FIGS. 1, 3A, and 3B) may comprise an aperture 16 (FIGS. 1, 3A, and 3B) which is similar in diameter to the interior of the blending container 11, and it may be temporarily attached to the blending container 11. Temporary attachment may comprise male and female threading, a cam engagement, or some other type of twist on and off attachment mechanism located on the second end 11B (FIGS. 1, 3A, and 3B) and the area of the blending container 11 that contacts the second end 11B (FIGS. 1, 3A, and 3B). An aperture 16 (FIGS. 1, 3A, and 3B) and nozzle 15 may be positioned on the blending container 11 which is configured to attach the sprout 201 of a food and beverage pouch 200.

In this example, the blending container may be removably connected to a blender base unit 13 to blend or otherwise process food wherein the blender base unit 13 is removably connected to an electric blender 50. The blender container 11 is configured to be attached to the sprout 201 of a food and beverage pouch 200 while still attached to the top of the blender base unit 13 and, optionally, the electric blender 50. In this embodiment, a user may remove a second end 11B (FIGS. 1, 3A, and 3B) from the blender container 11 and insert a plunger 14 into the blending container 11. Food and beverage may be pressed out of the blending container 11 through an aperture 16 (FIGS. 1, 3A, and 3B) and nozzle 15 as the plunger 14 is inserted into the blending container 11. In this manner, food and beverage may exit the system 100 and enter the sprout 201 of a food and beverage pouch 200 that is optionally attached to a nozzle 15.

In some embodiments, the stopgap 14B of the plunger 14 is configured with a recess that is capable of receiving the blender blades 51 of the blender base unit 13 to increase the distance the plunger 14 may be inserted into the blending container 11. In other embodiments, an optional plunger cap 21 may be temporarily attached, in a manner similar to the temporary attachment of the blender base unit 13 to the second end 11B (FIGS. 1, 3A, and 3B) which is configured to accept and guide the handle 14A of the plunger 14.

Figure 6:
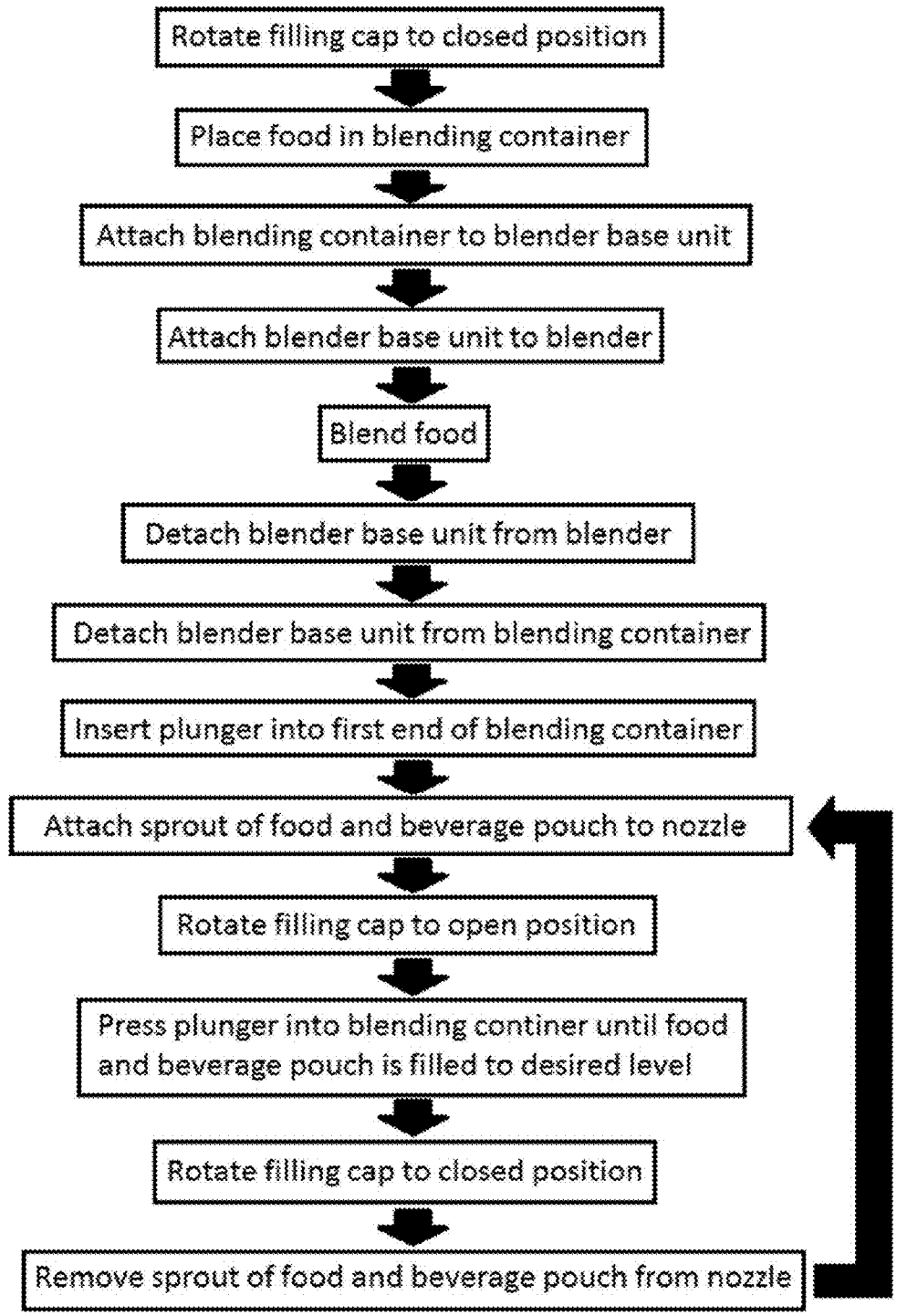
FIG. 6 depicts a flow chart of an exemplary method for using a blending container system to fill one or more food and beverage pouches with blended foods and beverages in accordance with some embodiments described herein.

FIG. 6 depicts a flow chart of an exemplary method of using a blending container system 100 (FIGS. 1 and 5) to fill one or more food and beverage pouches 200 (FIG. 5) with blended foods and beverages. In preferred embodiments, the method generally comprises the steps of: rotating the filling cap 12 (FIGS. 1, 2A, 2B, 3A, 3B, and 4) to closed position (FIG. 3A); place food in blending container 11 (FIGS. 1,3A, 3B, 4, and 5); attach blending container 11 (FIGS. 1,3A, 3B, 4, and 5) to blender base unit 13 (FIGS. 1 and 5); attach blender base unit 13 (FIGS. 1 and 5) to blender 50 (FIGS. 1 and 5); blend food; detach blender base unit 13 (FIGS. 1 and 5) from blender 50 (FIGS. 1 and 5); detach blender base unit 13 (FIGS. 1 and 5) from blending container 11 (FIGS. 1,3A, 3B, 4, and 5); insert plunger 14 (FIGS. 1 and 5) into first end 11A (FIG. 1) of blending container 11 (FIGS. 1,3A, 3B, 4, and 5); attach sprout 201 of food and beverage pouch 200 (FIG. 5) to nozzle (FIGS. 1, 2A, 2B, 3A, 3B, 4, and 5); rotate filling cap 12 (FIGS. 1, 2A, 2B, 3A, 3B, and 4) to open position (FIG. 3B); press plunger 14 (FIGS. 1 and 5) into blending container 11 (FIGS. 1,3A, 3B, 4, and 5) until food and beverage pouch 200 (FIG. 5) is filled to desired level; rotate filling cap 12 (FIGS. 1, 2A, 2B, 3A, 3B, and 4) to closed position (FIG. 3A); and then removing sprout 201 of food and beverage pouch 200 (FIG. 5) from nozzle (FIGS. 1, 2A, 2B, 3A, 3B, 4, and 5). A subsequent food and beverage pouch 200 (FIG. 5) may be filled by repeating the last five steps of the method beginning at: attach sprout 201 of food and beverage pouch 200 (FIG. 5) to nozzle (FIGS. 1, 2A, 2B, 3A, 3B, 4, and 5); rotate filling cap 12 (FIGS. 1, 2A, 2B, 3A, 3B, and 4) to open position (FIG. 3B); press plunger 14 (FIGS. 1 and 5) into blending container 11 (FIGS. 1,3A, 3B, 4, and 5) until food and beverage pouch 200 (FIG. 5) is filled to desired level; rotate filling cap 12 (FIGS. 1, 2A, 2B, 3A, 3B, and 4) to closed position (FIG. 3A); and then removing sprout 201 of food and beverage pouch 200 (FIG. 5) from nozzle (FIGS. 1, 2A, 2B, 3A, 3B, 4, and 5). By repeating the last five steps a desired number of food and beverage pouches 200 (FIG. 5) may be filled with the food and beverage contents of the blending container 11 (FIGS. 1,3A, 3B, 4, and 5).

DEFINITIONS

As used herein, the terms "food and beverage pouch", "pouch", or "pouches" shall generally mean a type of food and beverage container used to store, transport, and serve a food or beverage. Some examples of foods which may be contained in a pouch include but are not limited to; baby food, fruit, vegetables, yogurt, cottage cheese, etc. Some examples of beverages which may be contained in a pouch include but are not limited to; juice, milk, soda, water, and even alcoholic beverages such as mixed drinks, wine, spirits, and beer, etc. The term "contents" as used herein shall generally mean either food or beverages as described above. A pouch generally has only one single opening at its top (known as a "sprout") which is threaded with male threads and may include a cap or top which can be screwed onto the sprout to prevent food or beverages from spilling out of the pouch.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

REFERENCES—INCORPORATED HEREIN BY REFERENCE

U.S. Pat. No. 6,817,750
U.S. Pat. No. 7,066,640

I claim:

1. A blending container for processing food and beverage contents, the container comprising:
   (a) a fully open and unobstructed first end configured to receive unblended food and beverages, the first end serving as a bottom terminus of the container;
   (b) a closed second end with an aperture formed within a portion of the closed second end, the closed second end integrally forming a top terminus of the container, the aperture configured to allow blended food and beverage contents to escape the container into a food and beverage pouch;
   (c) a curved guide track formed within the closed second end, the curved guide track ending at the aperture;
   (d) a filling cap removably coupled to the closed second end of the container through male and female threading, the filling cap comprising a nozzle adapted to be aligned with the aperture of the closed second end of the container and the nozzle being configured to mate with the food and beverage pouch; and wherein the first end of the container is configured to be removably connected to a blender base unit equipped with a blender blade and wherein the filling cap is configured to be rotated in a first direction relative to the container to align to the nozzle and the aperture to form a first position and rotated in a second direction to disalign the nozzle and aperture forming a second position, the food and beverage contents being free to escape the container into the food and beverage pouch when the nozzle and the aperture are aligned in said first position and wherein the food and beverage contents are prevented from escaping the container by the second closed end when the nozzle and the aperture are disaligned in said second position.

2. The blending container of claim 1 wherein the curved guide track comprises a stop gap at a terminal end.

3. The blending container of claim 1 wherein the curved guide track comprises first terminal end and a second terminal end, the curved guide track comprising a stop gap at the first terminal end and the aperture at the second terminal end.

* * * * *